US008249811B2

(12) United States Patent
Petrovic

(10) Patent No.: US 8,249,811 B2
(45) Date of Patent: Aug. 21, 2012

(54) MULTI-SENSOR DETECTORS

(75) Inventor: Dragan P. Petrovic, Geneva, IL (US)

(73) Assignee: Honeywell International Inc., Morristown, NJ (US)

( * ) Notice: Subject to any disclaimer, the term of this patent is extended or adjusted under 35 U.S.C. 154(b) by 622 days.

(21) Appl. No.: 12/169,718

(22) Filed: Jul. 9, 2008

(65) Prior Publication Data

US 2010/0010743 A1 Jan. 14, 2010

(51) Int. Cl.
*G06F 19/00* (2006.01)

(52) U.S. Cl. ................................ 702/1; 702/22; 702/24

(58) Field of Classification Search ................ 702/1, 30, 702/189

See application file for complete search history.

(56) References Cited

U.S. PATENT DOCUMENTS

| | | | | |
|---|---|---|---|---|
| 3,474,267 A * | 10/1969 | Colberg | ........................ | 310/317 |
| 3,990,075 A * | 11/1976 | Schmitz et al. | ............... | 340/502 |
| 4,306,229 A * | 12/1981 | Tamura et al. | ................ | 340/629 |
| 4,586,110 A * | 4/1986 | Yamamoto | .................... | 361/307 |
| 4,986,670 A | 1/1991 | Uchiyama et al. | ............ | 374/117 |
| 5,189,902 A | 3/1993 | Groeninger | .................. | 73/24.06 |
| 2003/0020617 A1* | 1/2003 | Tice et al. | ..................... | 340/600 |
| 2005/0092067 A1* | 5/2005 | Petrovic et al. | .............. | 73/31.05 |
| 2006/0144142 A1* | 7/2006 | Gogoi | ........................ | 73/504.02 |
| 2008/0061654 A1* | 3/2008 | Matsuo | .................... | 310/323.01 |
| 2010/0217099 A1* | 8/2010 | LeBoeuf et al. | .............. | 600/301 |

FOREIGN PATENT DOCUMENTS

JP 04259099 A * 9/1992

OTHER PUBLICATIONS

Ward, Roger W., "A Filled Thermal System Utilizing a Gas Density Sensing Quartz Crystal Tuning Fork", Dec. 1985.

Ward, Roger W., "A Quartz Fluid Density Sensor Pressure Transducer", Dec. 1986.

Neuburger, Glen G., "Ambient Hydrogen Chrloride Sensing with a Zinc-Coated Piezoelectric Crystal Resonator", Oct. 2, 2007.

Nakamoto, Takamichi et al., "Development of Circuit for Measuring Both Q Variation and Resonant Frequency Shift of Quartz Crystal Microbalance", Nov. 1994.

Nakamotoa, Takamichi et al., "Study of Fire-Alarm System Using Plural Semiconductor and Quartz-Resonator Gas Sensors", Jul. 29, 1992.

Nakamura, Masayuki at al., "Application of Plasma Polymer Film Coated Sensors to Gas Identification Using Linear Filters", Jun. 25, 1995.

* cited by examiner

*Primary Examiner* — Jonathan C Teixeira Moffat
*Assistant Examiner* — Mischita Henson
(74) *Attorney, Agent, or Firm* — Husch Blackwell LLP

(57) ABSTRACT

A multi-sensor fire detector incorporates at least one acoustic resonator and other type or types of fire sensor. Other types include smoke sensors, gas sensors or optically based fire sensors. Outputs from the acoustic resonator can be processed with or without outputs from the other type or types of fire sensors to establish the presence of an alarm condition. Multiple acoustic resonators can be incorporated into the same detector.

17 Claims, 3 Drawing Sheets

MULTI-SENSOR DETECTORS

FIELD

The invention pertains to ambient condition detectors. More particularly, the invention pertains to such detectors which incorporate multiple, different ambient condition sensors.

BACKGROUND

Fire is a self-sustained fuel oxidation process that produces changes in the surrounding environment such as:

Temperature increases,

Concentration of various gases changes, particularly $O_2$, $CO_2$, CO and $H_2O$ Flames occur in some fires Smoke is generated in many fires Physical properties such as viscosity, speed of sound change due to temperature increase and changes in gas concentration Fire detection devices rarely go into alarm, but even when they do it is at times the case that alarm is not due to a fire. For example, dust can be mistaken for a fire-produced smoke and alarm is generated. There is a need to minimize number nuisance alarms like that one while maintaining or improving speed of response to a real fire.

Successful discrimination between fires and nuisances depends on the ability to sense different characteristics of fires in cost-efficient way. Signal processing from multiple sensors minimizes the probability of generating an alarm due to a nuisance stimulus while increasing speed of response to a real fire.

Choice of a sensing element, or elements, depends on many factors. Sensors should preferably be responsive to many if not all types of fire. A sensor should also be reliable, rugged, small, and inexpensive, with a good signal-to-noise ratio while consuming small amounts of electrical power.

DETAILED DESCRIPTION

Figure 1:
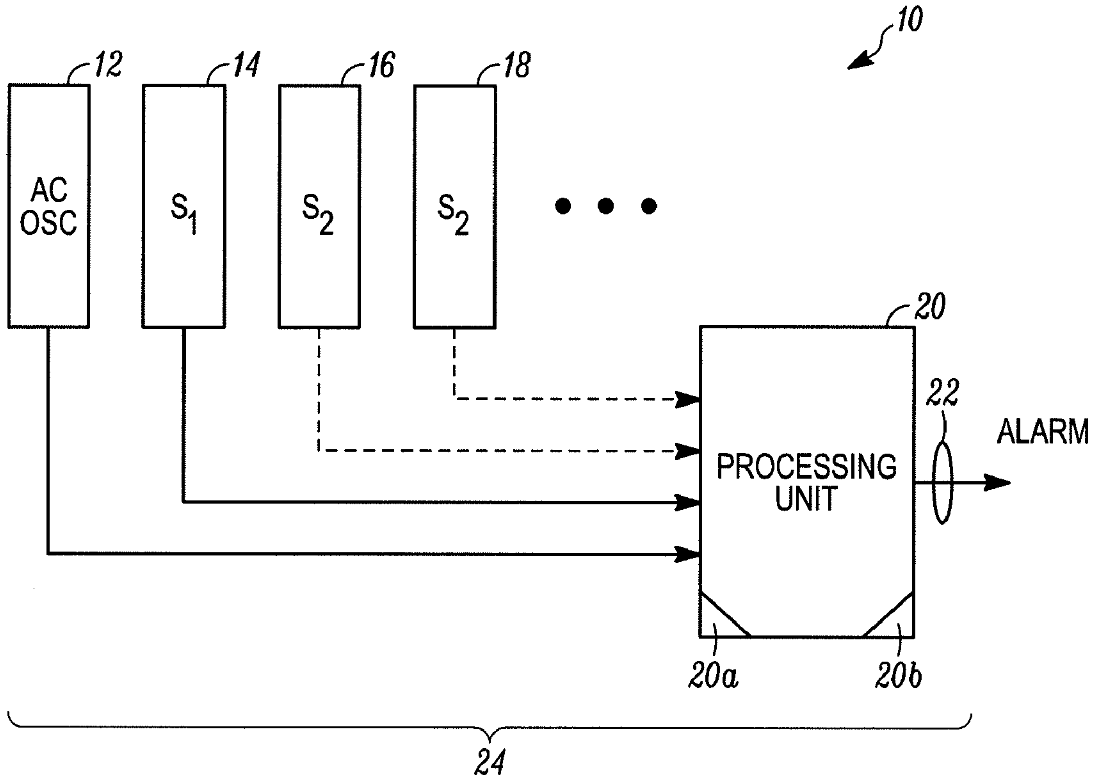
FIG. 1 is a block diagram of one embodiment of the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Objects which exhibit periodic motion, such as quartz crystal oscillators operating under standard pressure and temperature conditions resonate at natural frequencies that are determined by geometry, mass density, other properties of the crystal and the viscous drag force. In case of fire, smoke particulates also have an impact on motion of such objects, including crystal resonators. The viscosity of air depends on both concentration of chemical constituents that are present in the ambient and temperature. Therefore, appropriately configured crystal oscillators can be used to sense fires. Alternately, other types of devices which exhibit periodic motion, for example nano-motors, can also be used to sense conditions associated with fires.

In accordance with the invention, at least one acoustic resonator, for example, a quartz crystal oscillator, or, other type of acoustic resonator can be incorporated as one of the sensors in a multi-criteria fire detector. Quartz resonators change resonant frequency and resonator Q-factor when a local fire changes ambient conditions. Measurements of those two quantities, alone or in combination with outputs from other types of sensors, can be used as indicators of fire.

Quartz resonators can also be configured to measure speed of sound, attenuation of sound and frequency dispersion of sound when fire events occur. These three quantities also change in fires. Measurements of changes in one or more quantities (resonant frequency, Q-factor, speed of sound, attenuation of sound and frequency dispersion of sound) can be used as an additional factor in determining the presence of a fire condition. One or more resonators can be used alone or, along with other types of ambient condition sensors in multi-criteria detectors.

Quartz resonators come in hermetically sealed packages since exposure to ambient has an impact on both resonant frequency and Q-factor of the resonator. In this regard, known tuning forks are often provided in hermetically sealed packages. Representative units often have a resonant frequency of 32768 Hz and Q-factor of ~50,000. When exposed to an ambient atmosphere, the resonant frequency drifts with environmental changes and Q-factor drops to ~8,000 because of the effects of the viscosity of ambient air.

Changes in resonant frequency and Q-factor of a single acoustic resonator, such as a tuning fork, can be sensed and used as a fire indicator. One may monitor changes in both resonant frequency and Q-factor of a single tuning fork as a fire indicator since changes in composition and temperature of air will have an impact on viscosity of air. Additionally, one can use two or more acoustic resonators, such as tuning forks, to measure speed or velocity of sound and attenuation of sound as sensing quantities.

It will be understood that various types of vibratory sensing elements come within the spirit and scope of the invention. These include, without limitation, other types of mechanical oscillators, electrical oscillators, electro-mechanical structures such as piezoelectric devices or nano-motors. Neither the specific mechanical configuration, nor the electrical output characteristics of such devices are limitations of the present invention.

FIG. 1 is a block diagram of a fire detector 10 which embodies the invention. Detector 10 includes an acoustic resonator or oscillator 12, and one or more ambient condition sensors 14, 16, 18 which respond to different fire related conditions than does sensor 12. Outputs from all of the sensors 12-18 are coupled to processing unit 20 which can establish the presence of a developing or an actual fire condition in accordance with a multi-sensor criterion and generate a corresponding alarm indicating indicium 22. Sensors 14-18 can be selected from a class which includes at least smoke sensors, gas sensors, fire sensors, thermal sensors, flow sensors and acoustic sensors, all without limitation.

Resonator response can be enhanced by changing surface roughness to increase drag forces due to airborne particulate matter, such as smoke particles. Alternately, the housing or container for such sensors can be designed to increase drag forces.

Sensor sensitivity to particular airborne particulate matter can be altered by use of one or more surface coatings. Coatings of zeolites, or surfactants, for example can be used. If a surface of a resonator, for example, a crystal oscillator, or a tuning fork is coated with a surfactant that repels water, or a zeolite that absorbs a specific gas then the device's mass will be affected with a resulting alternation of its resonant frequency.

Detector 10 can be carried by and within housing 24. Processing unit 20 can be located within housing 24, or can be distributed with part in housing 24 and part located at a displaced alarm monitoring and control system. Unit 20 can be implemented with one or more programmable processors, such as 20*a* which can execute local, control software 20*b* stored on a computer readable medium.

Figure 2:
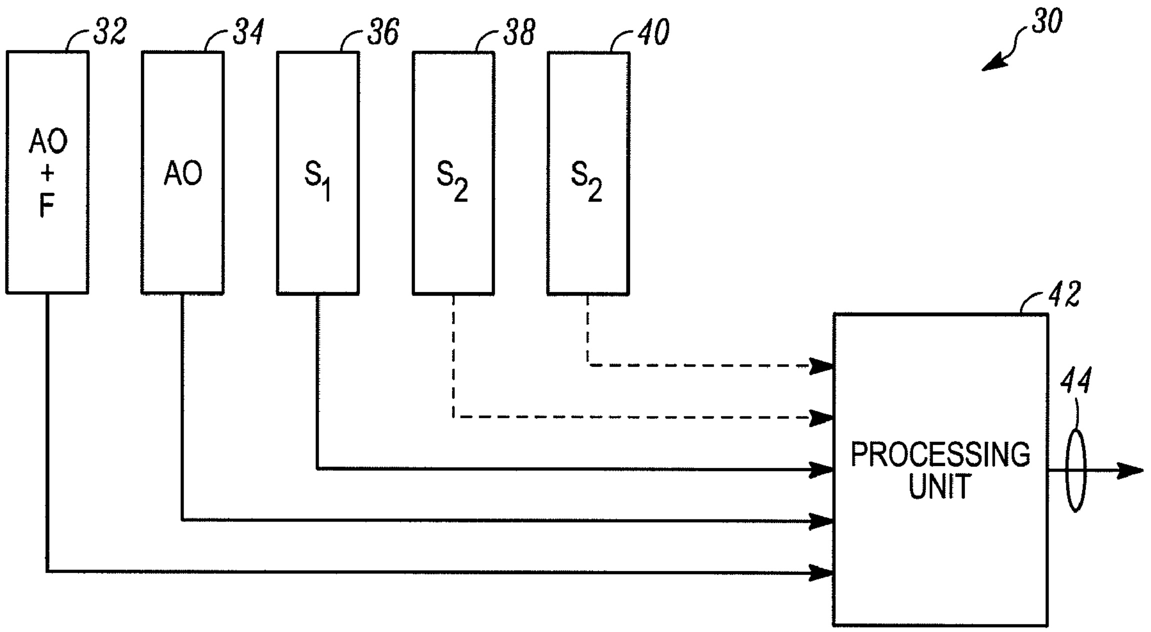
FIG. 2 is a block diagram of another embodiment of the invention.

FIG. 2 is a block diagram of a fire detector 30 which includes two acoustic resonators or oscillators, 32, 34 and one or more different ambient condition sensors 36, 38, 40. One of the resonators, such as 32 includes a filter F of airborne smoke related particulate matter. The other, sensor 34, is exposed directly to the ambient atmosphere.

The differences between signals output by sensors 32, 34 are an indication of the affect of airborne smoke related particulate matter on resonator functioning. Outputs of all sensors 32-40 are coupled to processing unit 42, local or in part displaced as discussed above. Processing unit 42 can carry out predetermined multi-sensor processing to establish either a developing or actual fire condition and produce an indicium thereof 44.

Figure 3:
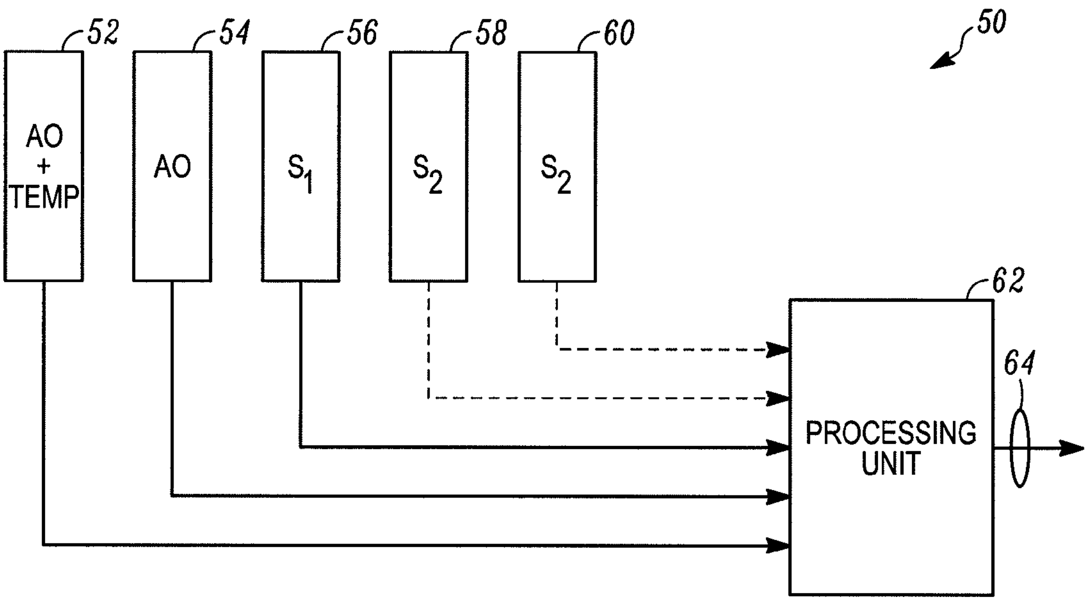
FIG. 3 is a block diagram of yet another embodiment of the invention.

FIG. 3 is a block diagram of another detector 50 which embodies the invention. Detector 50 includes a sealed acoustic resonator 52 and a second acoustic resonator 54 which is open to the ambient atmosphere. In the embodiment 50, a processing unit 62 is also coupled to ambient condition sensors 56-60 as discussed above Processing unit 62 can evaluate the differences between signals from sensors 52, 54 to establish an indication of temperature in the immediate area and its affect on the operation of sensor 54. Processing unit 62 can then generate an indicium 64 indicative of either a developing or an actual fire condition.

Figure 4:
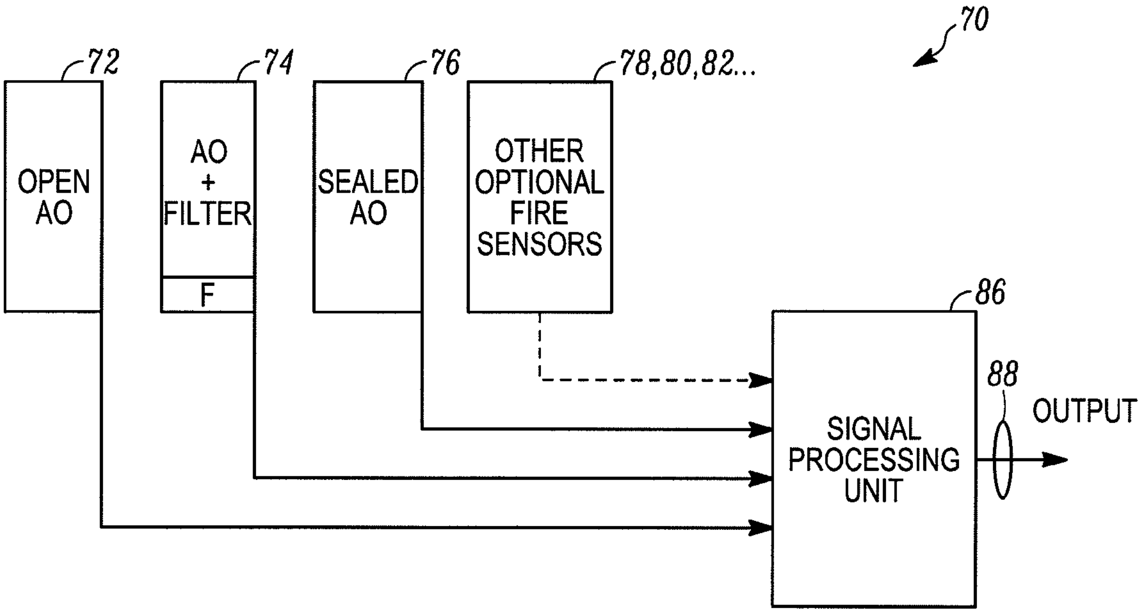
FIG. 4 a block diagram of a further embodiment of the invention.

FIG. 4 is a block diagram of yet another detector 70 in accordance with the present invention. One acoustic oscillator, for example a tuning fork, 72 is completely exposed to the ambient atmosphere. A second one 74 includes a filter F and is exposed to ambient from which particulate matter (to a large extent) has been filtered. A third acoustic oscillator 76 is sealed at atmospheric pressure.

Analyzing the combination of output signals from the three sensors 72-76 enables signal processing unit 86 to evaluate the extent of particulate matter in the air, temperature of the air and chemical composition changes in the ambient. Signal processing unit 86 also processes signals from ambient condition sensors, 78, 82 . . . of a type discussed above and then generates alarm condition indicator on its output 88. The indicator at output 88 can be announced either locally or from a common fire alarm control unit that processes outputs from a plurality of fire detectors.

In embodiments which incorporate two or more acoustic resonators, for example crystal oscillators, it is useful to supervise and track responses for each crystal oscillator. In fact, normal ambient conditions may involve sizeable changes in humidity, temperature and $CO_2$ concentration (e.g. meeting in a small conference room). Signal processing unit 86 can, for example, identify signals that can be characterized as normal ambient variations which do not generate alarms. Hence, a normal clear air baseline that is used to detect fire event can be adjusted in accordance with such variations.

Figure 5:
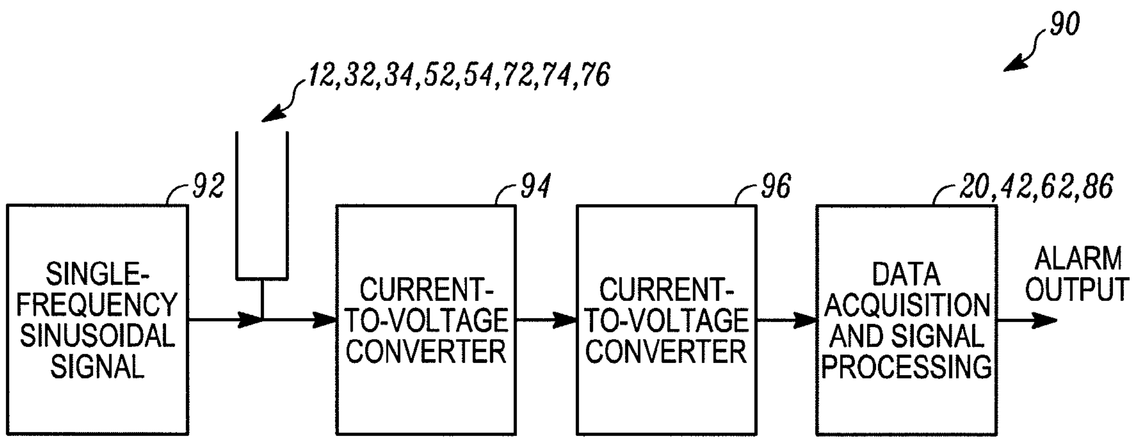
FIG. 5 illustrates exemplary excitation and processing circuitry.

FIG. 5 illustrates added details of exemplary processing circuitry 90 which can be used with previously discussed embodiments of FIGS. 1-4, without limitation. For example, circuitry 90 can excite an acoustic resonator 12, 32, 34, 52, 54, 72, 74, 76 which could be implemented as a tuning fork, or any other type of acoustic resonator, with a pure sine wave 92 at one frequency. A current-to-voltage converter/amplifier, such as 94, can be used to generate a sinusoidal output signal and determine its amplitude and phase with respect to driving signal 92. The same can be done by sequential measurements at two or more frequencies using a second current-to-voltage converter/amplifier 96. Outputs from converter/amplifiers such as 94, 96 can be processed by signal processing units such as 20, 42, 62, 86. Detecting responses, as noted above, at two frequencies can indicate whether the resonant frequency is going up or down.

Other possible electronic arrangements include:

Placing a resonator, such as a tuning fork in an oscillator circuit whose output is coupled to a narrow band-pass filter, which could be implemented preferably digitally using software, or in hardware.

Placing a resonator, such as a tuning fork in an oscillator circuit. The resulting signal can be mixed with a fixed oscillator signal. The resulting low-frequency (beat) signal can be analyzed for detection of fire event.

An acoustic oscillator can be driven with a single-frequency sinusoidal wave. The response can be subjected to a phase-locked loop analysis in hardware (or DSP software) for a determination of phase shift (that can be used for fire detection as well). Amplitude measurements of course can also be used.

In case of two or more oscillators a voltage follower can be used to decouple signals from sensors and then mix those signals for further analysis.

Figure 6:
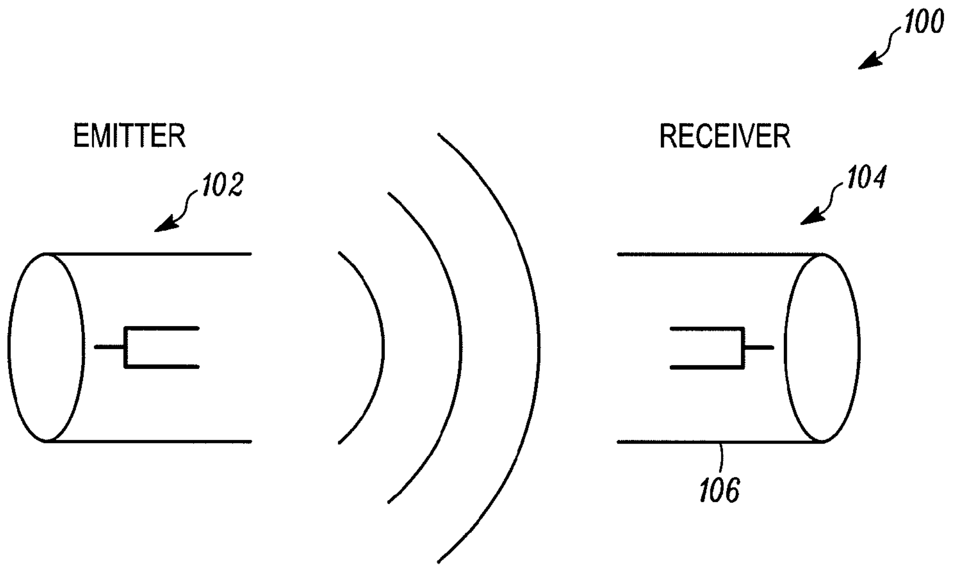
FIG. 6 illustrates an exemplary sensor in accordance with the invention.

FIG. 6 illustrates a configuration 100 with an emitter 102 and a receiver 104. The elements 102, 104 could be enclosed in a container, such as 106 which excludes particulate matter. The configuration 100 can be used for measuring various acoustic properties such as speed of sound, wavelength, or attenuation all without limitation. Alternately, housing 106 could include a smoke and dust filter such that sensed ambient air would be without that particulate matter.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. An ambient condition detector comprising:

a housing;

a first acoustic resonator carried by the housing and responsive to a developing fire condition;

a second acoustic resonator with a filter carried by the housing and responsive to a developing fire condition;

at least one ambient condition sensor carried by the housing and responsive to a developing fire condition; and control circuits, carried by the housing, coupled to the first and second acoustic resonators and to the at least one ambient condition sensor, where the control circuits respond to signals from the first acoustic resonator and the second acoustic resonator with the filter to determine an affect of airborne smoke related particulate matter on resonator frequency, and where the circuits respond to signals from each of the first and second acoustic resonators and from the at least one ambient condition sensor to determine the existence of a fire condition.

2. A detector as in claim 1 where the control circuits include a programmable processor and executable control software.

3. A detector as in claim 1 where the first acoustic resonator emits a signal at a first frequency in the absence of a fire condition and emits a signal at a second, different, frequency in the presence of a fire condition.

4. A detector as in claim 2 where the control circuits respond to one of, a change from a first frequency to a second frequency in determining the existence of the fire condition, or, first and second differences between first and second frequencies.

5. A detector as in claim 4 where the control circuits include a programmable processor and executable, control software, stored on a non-transitory computer readable medium.

6. A detector as in claim 5 where the software, in determining the existence of the fire condition, responds to the signals from each of the first and second acoustic resonators and from the at least one ambient condition sensor by one of, comparing a frequency parameter of the signal from the first acoustic resonator to a predetermined value, or, evaluating first and second differences between the signals from each of the first and second acoustic resonators and from the at least one ambient condition sensor.

7. A detector as in claim 1 where the at least one ambient condition sensor is selected from a class which includes optical fire sensors, gas sensors, thermal sensors, flow sensors and smoke sensors.

8. A detector as in claim 1 where the control circuits respond to signals from the first acoustic resonator and the second acoustic resonator with the filter to establish at least one of changes in a velocity, attenuation of sound or frequency dispersion.

9. An ambient condition detector comprising:

a housing;

at least two different vibratory atmospheric sensors, carried by the housing, at least one of the sensors is responsive to a developing fire condition;

at least one ambient condition sensor; and control circuits, carried by the housing, coupled to the at least two different vibratory sensors and to the at least one ambient condition sensor, the control circuits respond to signals from each of the at least two different vibratory sensors to determine an effect of airborne smoke related particulate matter on resonant frequency and to signals from the at least one ambient condition sensor to determine the existence of a fire condition, where a first of the vibratory atmospheric sensors is sealed, a second of the vibratory atmospheric sensors is open to ambient atmosphere, and the control circuits evaluate signals from the first and second vibratory atmospheric sensors to establish an indication of temperature in the ambient atmosphere and an effect of the temperature on operation of the detector.

10. A detector as in claim 9 which includes a filter of airborne particulate matter associated with one of the two vibratory atmospheric sensors.

11. A detector as in claim 9 which includes a second, sealed vibratory sensor.

12. A detector as in claim 11 where the control circuits include sensor is excitation circuitry where the circuitry is coupled to respective ones of the sensors.

13. A detector as in claim 12 wherein the a least one ambient condition sensor is selected from a class which includes optical fire sensors, gas sensors, thermal sensors, flow sensors and smoke sensors.

14. A fire detector comprising:

a first oscillatory sensing element completely exposed to an ambient atmosphere;

a second oscillatory sensing element including a filter and exposed to the ambient atmosphere from which particulate matter has been filtered;

a third oscillatory sensing element sealed at atmospheric pressure;

at least one ambient condition sensor; and control circuits coupled to the first, second, and third oscillatory sensing elements and to the at least one ambient condition sensor, wherein, responsive to signals from the first, second, and third oscillatory sensing elements and from the at least one ambient condition sensor, the control circuits determine an effect of airborne smoke related particulate matter on resonator frequency and the existence of a fire condition from the effect on resonator frequency and generate fire related indicia, and wherein the control circuits analyze output signals from the first, second, and third oscillatory elements to evaluate the particulate matter in the ambient atmosphere, temperature of the ambient atmosphere, and chemical composition changes in the ambient atmosphere.

15. A detector as in claim 14 where the each of the first, second, and third elements is selected from a class which includes mechanical oscillators, electrical oscillators, and piezoelectric vibrators.

16. A detector as in claim 15 where characteristics of at least one of the first, second, and third elements have been altered by at least one of, roughening a surface thereof to increase drag forces, enclosing the element in a container of a selected geometry to increase drag forces, or coating at least portions of the element with a material that will alter performance thereof in response to the presence of specific predetermined gases.

17. A detector as in claim 14 where the at least one ambient condition sensing element fourth sensor is selected from a class which includes at least a smoke sensor, a gas sensor, a radiant energy fire sensor, a flow sensor and a thermal sensor.

* * * * *